United States Patent

Hampiholi (10) Patent No.: US 10,228,767 B2
(45) Date of Patent: Mar. 12, 2019

(54) POSITION-BASED INTERACTIVE PERFORMANCE SYSTEM

(71) Applicant: HARMAN INTERNATIONAL INDUSTRIES, INC, Stamford, CT (US)

(72) Inventor: Vallabha Hampiholi, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 31 days.

(21) Appl. No.: 14/656,581

(22) Filed: Mar. 12, 2015

(65) Prior Publication Data

US 2016/0266651 A1 Sep. 15, 2016

(51) Int. Cl.
*G06F 3/01* (2006.01)
*A63J 5/02* (2006.01)
*A63J 5/04* (2006.01)
*G06F 3/00* (2006.01)

(52) U.S. Cl.
CPC .............. *G06F 3/017* (2013.01); *A63J 5/02* (2013.01); *A63J 5/04* (2013.01); *G06F 3/005* (2013.01)

(58) Field of Classification Search
CPC .......... G06F 3/017; G06F 3/014; G06F 3/013; H04M 1/7253; G06K 9/62
See application file for complete search history.

(56) References Cited

U.S. PATENT DOCUMENTS

| 8,847,850 | B1 * | 9/2014 | Cho | G02B 27/017 345/7 |
| 9,380,621 | B2 * | 6/2016 | Jamal-Syed | H04M 1/7253 |
| 2010/0250871 | A1 * | 9/2010 | Onizuka | G10L 19/16 711/154 |
| 2011/0037712 | A1 * | 2/2011 | Kim | H04M 1/7253 345/173 |
| 2013/0257720 | A1 * | 10/2013 | Noda | G06F 3/017 345/157 |

FOREIGN PATENT DOCUMENTS

WO WO 2013154476 A1 * 10/2013 .......... H04M 1/7253

* cited by examiner

*Primary Examiner* — Sepehr Azari
(74) *Attorney, Agent, or Firm* — Artegis Law Group, LLP (57) ABSTRACT

In various embodiments, a control application enables mobile control of output devices, such as speakers. In operation, the control application receives visual data from a mobile device and one or more cameras that track motions associated with the mobile device. Based on the location of the mobile device and an angle of interest indicated by the visual data transmitted from the mobile device, the control application selects one or more output devices. The control application then processes the visual data provided by the cameras in order to identify and extract gestures and transmit associated control signals to the selected output devices.

22 Claims, 6 Drawing Sheets

POSITION-BASED INTERACTIVE PERFORMANCE SYSTEM

BACKGROUND

Field of the Invention

Embodiments of the present invention relate generally to audiovisual systems and, more specifically, to a position-based interactive performance system.

Description of the Related Art

Disc jockeys commonly orchestrate presentations that feature audiovisual content, such as variety shows, concerts, and performances at raves. Notably, a primary responsibility of many disc jockeys, also known as DJs, is to select and play music for audiences in a variety of settings (e.g., nightclubs, stadiums, auditoriums, etc.). Ideally, during a performance, the DJ monitors the reactions of the audience and tailors the selection and presentation (e.g., volume, audio mixing, etc.) of the music to increase audience interest. In addition to controlling the music, the DJ often supplements the performance using a variety of techniques, such as engaging the audience verbally, strategically controlling lighting, creating special effects, etc.

To enable the DJ to efficiently perform the multitude of tasks involved in creating a rich sensory experience, a DJ console provides a variety of functionality that facilitates customized control of DJ equipment. For instance, the DJ console may enable the DJ to mix audio tracks, control the volume of individual speakers, adjust the tempo of the music, generate fog, dim lighting, etc.

Because the DJ console enables the DJ to more efficiently create a desired sensory experience, the DJ often feels compelled to remain at the DJ console. Although remaining at the DJ console may be acceptable at relatively small gatherings, at other events, such as live performances in arenas, remaining stationary may prevent the DJ from effectively monitoring the audience. Consequently, the audience at such events may become disengaged. Further, audience disengagement may reduce the overall quality of the performance, potentially offsetting any benefits provided by the DJ console.

In order to leverage the versatility provided by the DJ console without "trapping" the DJ at the DJ console, some DJs perform in conjunction with sound engineers. For example, and without limitation, the DJ may interact freely with the audience, while the sound engineer operates the DJ console. However, such an arrangement not only relies on the sound engineer but also reduces the ability of the DJ to dynamically tune the performance to the audience.

As the foregoing illustrates, what is needed in the art are more effective techniques for controlling disc jockey equipment.

SUMMARY

One embodiment of the present invention sets forth a computer-implemented method for controlling output devices. The method includes determining an angle of interest based on first visual data received from a mobile device, selecting an output device based on a location of the mobile device and the angle of interest, analyzing second visual data to determine a gesture associated with the mobile device, and, in response to the gesture, transmitting a first control signal to the first output device.

Further embodiments provide, among other things, a system and a non-transitory computer-readable medium configured to implement the method set forth above.

At least one advantage of the disclosed techniques is that a user of the mobile device can move freely while maintaining control of various types of output devices. In particular, a user may dynamically manipulate performance-related output devices, such as speakers, lighting, and special effects, while observing and interacting with the audience. In this fashion, the user may knowledgably fine-tune output devices to optimize the performance for the audience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Performance System Overview

Figure 1A:
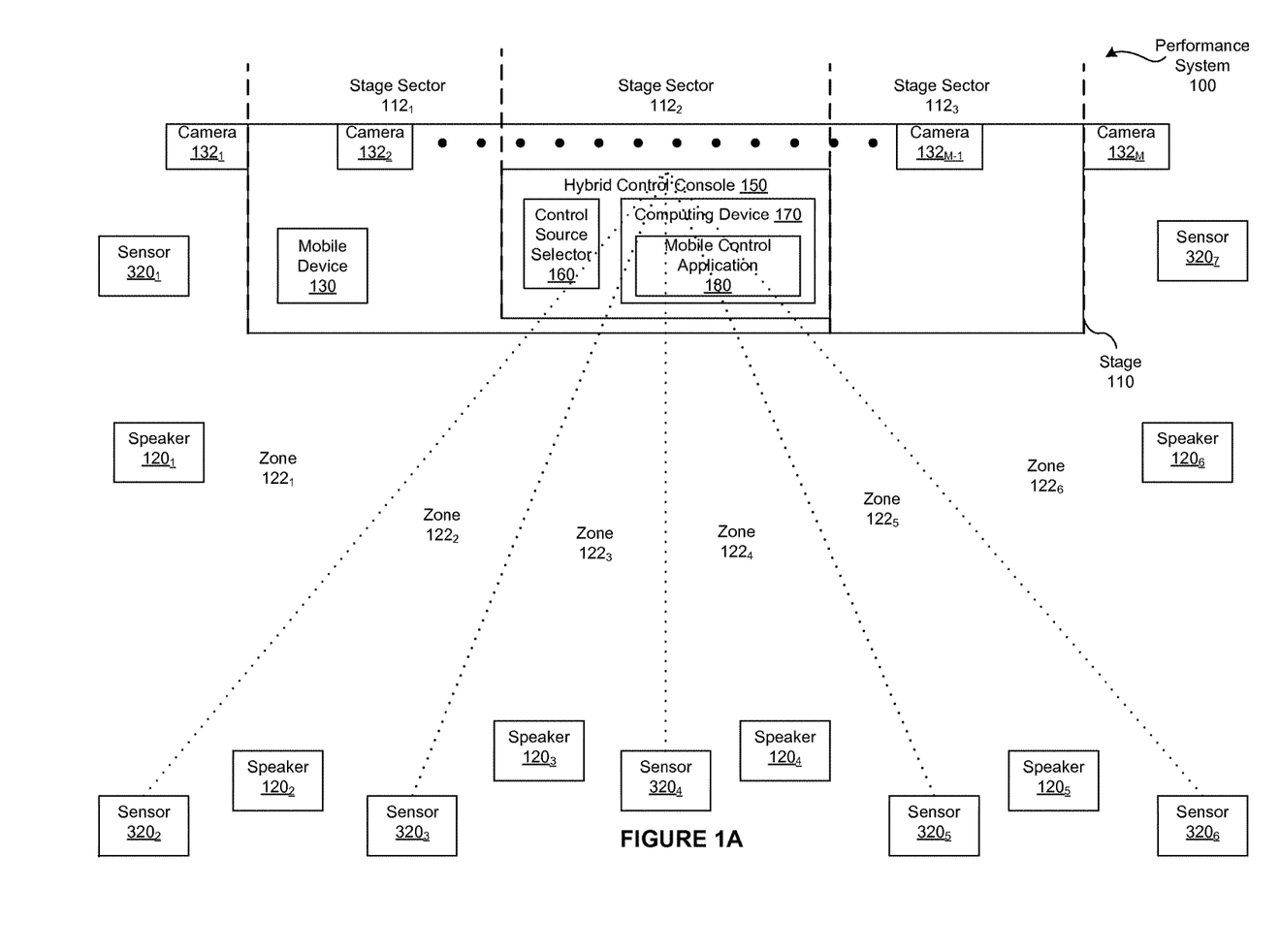
FIG. 1A illustrates a performance system for generating an audiovisual performance, according to various embodiments.

FIG. 1A illustrates a performance system 100 for generating an audiovisual performance, according to various embodiments As shown, the performance system 100 includes, without limitation, a stage 110 and any number of speakers 120. In alternate embodiments, the performance system 100 may be implemented in other structures or locales and may include other types of sensory generating equipment, referred to herein as "DJ equipment," such as audio, lighting, and special effects equipment.

Among other things, the stage 110 includes a hybrid control console 150 that serves as the master controller of DJ equipment included in the performance system 100. In particular, the hybrid control console 150 issues signals that control and coordinate operations of the speakers 120. Although not shown, the hybrid control console 150 includes multiple selection mechanisms that enable the DJ to convey desired performance characteristics. For example, and without limitation, the hybrid control console 150 may include a volume knob, a mute button, and a multi-deck controller to mix digital audio tracks. In addition, the hybrid control console 150 may include a mechanism that allows the DJ to select one or more targets (e.g., zones) to be controlled by the DJ.

Ideally, the DJ monitors the audience and uses the hybrid control console 150 to optimize the entertainment experience for the audience. For example, and without limitation, suppose that the DJ notices that a certain portion of the audience has become disengaged. To re-engage the identified portion of the audience, the DJ may configure the speakers 120 that are closest to the identified portion of the audience to broadcast a verbal request to sing along.

In conventional systems, the DJ can control and modify the performance only when the DJ is relatively close to the DJ console. If the DJ moves away from the DJ console to interact with and monitor the audience, then the DJ relinquishes control of the performance, such as the music and/or visual effects. However, if the DJ remains close to the DJ console, then the DJ is able to control the performance, but the connection between the DJ and the audience may suffer.

Accordingly, the hybrid control console 150 includes a control source selector 160 that enables the DJ to switch between the conventional console-based control mode and a mobile control mode. The control source selector 160 may be implemented in any technically feasible fashion, such as via a toggle switch, control knob, touchscreen interface, and the like.

Mobile Control Mode

To support the mobile control mode, the performance system 100 includes a mobile control application 180 that generates control signals based on visual data received from a mobile device 130 and/or cameras 132. Notably, while the hybrid control console 150 is in the mobile control mode, the mobile control application 180 generates control signals that override or supplement the control signals emitted by the selection mechanisms embedded in the hybrid control console 150. In some embodiments, the mobile control application 180 is stored in a memory unit (not shown in FIG. 1A) and is executed by a computing device 170 included in the hybrid control console 150.

The computing device 170 may be any type of device capable of executing application programs. For instance, the computing device 170 may be a processing unit, a laptop, a tablet, a smartphone, etc. The mobile control application 180 may be stored in any type of memory that may or may not be integrated with the computing device 170. In some embodiments, the mobile control application 180 is stored in a universal serial bus (USB) flash drive that is connected to a USB port of the computing device 170.

The mobile device 130 is a wearable, camera-enabled unit that conveys the visual perspective of the DJ. In some embodiments, the mobile device 130 includes headphones and attached camera. In other embodiments, the mobile device 130 includes a pair of camera-equipped eyeglasses. To determine the location and viewing angle of the DJ, the mobile control application 180 compares the visual data received from the mobile device 130 to pre-determined patterns defined by sensors 320 strategically deployed within the performance system 100.

For example, and without limitation, if the DJ is facing the audience and standing on the left-most (with respect to the DJ) portion of the stage 110, then the visual data received from the mobile device 130 includes a pattern that indicates that the sensors $320_5$ and $320_6$ are both situated roughly in front of the DJ. The mobile control application 180 may be configured to recognize the specific patterns of the sensors 320 from various positions and angles on the stage 110 using any type of pattern recognition technique known in the art. Further, the sensors 320 may be implemented in any technically feasible fashion that is conducive to the performance environment. For example, and without limitation, the sensors 320 may be text-based to minimize cost or infrared-based to facilitate identification in low lighting conditions without interfering with the performance.

Based on the location and viewing angle of the DJ, the mobile control application 180 selects one or more of the speakers 120 for remote control. To facilitate the selection process, the performance system 100 is divided into zones 122, each of which may include one or more speakers 120. In some embodiments, the mobile control application 180 applies heuristics to the location and viewing angle of the DJ to determine "active" zones 122. The mobile control application 180 then selects the speakers 120 included in these active zones 122 as the current targets of control signals generated by the mobile control application 180.

In one embodiment, if the mobile control application 180 determines that the DJ is standing in the middle of the stage 110 and is directly facing the audience, then the mobile control application 180 activates all of the zones 122. Consequently, until the location and/or viewing angle of the DJ changes, the mobile control application 180 generates control signals that modify aspects (e.g., volume, tone, effects, etc.) of all of the speakers 120.

To reduce the run-time computations associated with determining which zone(s) 122 are active, the stage 110 may be divided into pre-defined stage sectors 112. In some embodiments, during a setup phase, for each of the stage sectors 112, the mobile control application 180 precomputes the viewing angles that delineate the various zones 122. For explanatory purposes, in FIG. 1A, the dotted lines depict the set of delineation viewing angles associated with a DJ that is standing in the center of the stage 110 (in stage sector $112_2$). As persons skilled in the art will recognize, the precision of the selection process correlates to the granularity of the stage sectors 112 and the number of zones 122 that are configured during the setup phase. In alternate embodiments, the mobile control application 180 calculates the angles that delineate the various zones 122 at run-time (e.g., during a performance) and the precision of the selection process correlates to the number of zones 122 and the accuracy of the sensors 320.

After selecting the speakers 120 for remote control, the mobile control application 180 receives video feeds provided by the cameras 132. The cameras 132 may be arrayed in any fashion that enables the cameras 132 to comprehensively track the motions of the DJ. While operating in the mobile control mode, the mobile control application 180 continuously analyzes the video feeds from the cameras 132 that are aimed at the location of the mobile device 130 and, consequently, the DJ. As part of this analysis, the mobile control application 180 may implement any machine vision algorithms known in the art to extract pre-defined human gestures from the video feeds. In some embodiments, the mobile control application 180 filters the gestures based on face recognition techniques and ignores gestures associated with humans other than the DJ.

After determining the gestures of the DJ, the mobile control application 180 maps the gestures to control signals. Subsequently, because the control source selector 160 state is "mobile control mode," the mobile control application 180 causes the speakers 120 targeted for remote control to perform the actions specified by the gestures on the control source selector 160. The mobile control application 180 may orchestrate the selected actions in any technically feasible fashion. For example, in some embodiments, the mobile control application 180 may indirectly drive the speakers 120 via, and without limitation, an audio management system (not shown). Any number of gestures may be mapped to any number of control signals that implement any technically feasible actions. In one embodiment, the mobile control application 180 monitors the position, viewing angle, and gestures of the DJ to enable mobile, hands-free:

- zone-specific volume control of speakers
- audio panning across zones
- zone-specific muting/unmuting of speakers
- streaming of different music and/or sound effects to different zones
- swapping of music between zones
- zone-specific tempo control In alternate embodiments, the speakers 120 may be supplemented and/or replaced with any number and type of sensory-generating equipment. For example, and without limitation, a fog machine, a smoke machine, and spot lights may also be included in the performance system 100 and controlled in the conventional console-based control mode and/or the mobile control mode. In some embodiments, the control source selector 160 is omitted from the hybrid control console 150 and implemented as an override switch that is situated proximally to the mobile device 130. The mobile device 130 may establish the DJ position and/or viewing angle in any technically feasible fashion. For example, and without limitation, the mobile device 130 may rely on landmarks other than the sensors 320, such as the speakers 120. In some embodiments, the performance system 100 is configured to allow the DJ to control the speakers 120 from any location in the performance system 100, not only the stage 110. In such embodiments, additional sensors 320 and cameras 312 may be deployed to ensure that the location, viewing angle, and gestures of the DJ are captured in any location that may be accessed by the DJ during the performance.

Although the user that controls the speakers 120 is referred to herein as the "DJ," the user may be any type of coordinator/orchestrator/performer etc. that controls the speakers 120 or any similar equipment. For instance, in some embodiments, the user may be a talk show host that mingles with the audience. The various components included in the performance system 100 may communicate in any technically feasible fashion using any protocols known in the art. For example, and without limitation, the mobile device 130 may communicate with the mobile control application 180 via Bluetooth wireless technology, and the cameras 132 may communicate with the mobile control application 180 using a local area wireless technology, such as Wi-Fi.

Figure 1B:
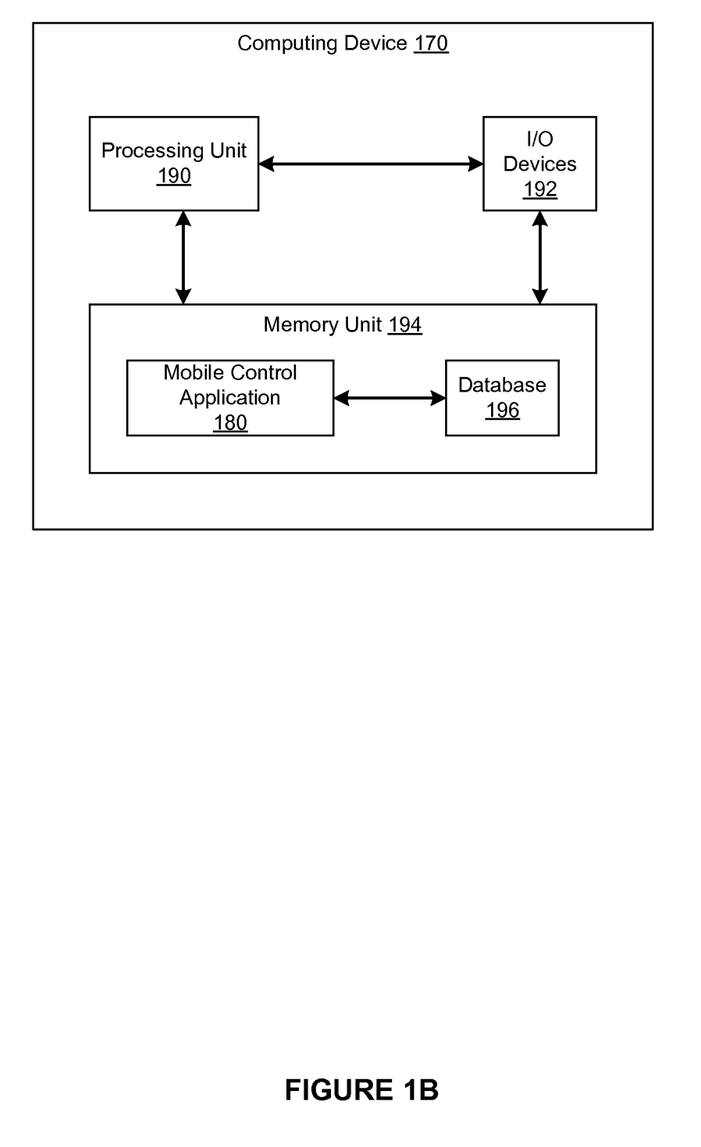
FIG. 1B illustrates the computing device of FIG. 1A, according to various embodiments.

FIG. 1B is a block diagram of the computing device 170 of FIG. 1A, according to various embodiments. As shown, computing device 170 includes a processing unit 190, input/output (I/O) devices 192, and a memory unit 194. Memory unit 194 includes the mobile control application 180 and is configured to interact with a database 196.

Processing unit 190 may include a central processing unit (CPU), digital signal processing unit (DSP), and so forth. I/O devices 192 may include input devices, output devices, and devices capable of both receiving input and providing output. Memory unit 194 may include a memory module or collection of memory modules. The mobile control application 180 within the memory unit 194 may be executed by processing unit 190. The database 196 may store digital signal processing algorithms, audio streams, gesture recognition data, volumetric display data, and the like.

Computing device 170 as a whole may be a microprocessor, an application-specific integrated circuit (ASIC), a system-on-a-chip (SoC), a mobile computing device such as a tablet computer or cell phone, a media player, and so forth. Generally, computing device 170 may be configured to coordinate the overall operation of the performance system 100. In other embodiments, the computing device 170 may be coupled to, but separate from the performance system 100. In such embodiments, the performance system 100 may include a separate processor that receives data (e.g., audio streams) from and transmits data (e.g., sensor data) to the computing device 170, which may be included in a consumer electronic device, such as a vehicle head unit, navigation system, smartphone, portable media player, personal computer, and the like. However, the embodiments disclosed herein contemplate any technically feasible system configured to implement the functionality of the performance system 100.

Hybrid Control Console

Figure 2:
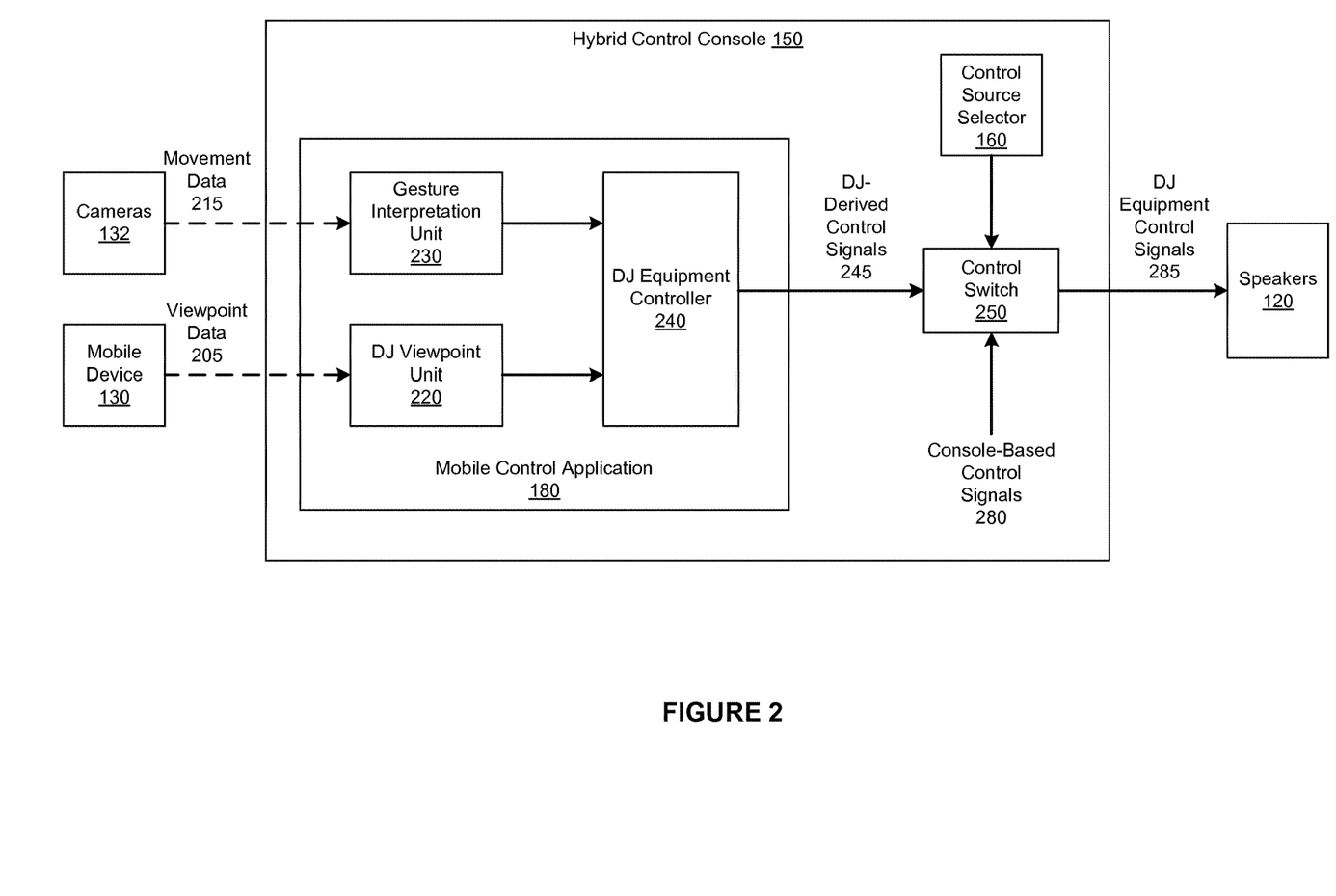
FIG. 2 is a block diagram illustrating the hybrid control console of FIG. 1A, according to various embodiments.

FIG. 2 is a block diagram illustrating the hybrid control console 150 of FIG. 1A, according to various embodiments. In general, the hybrid control console 150 generates DJ equipment control signals 285 that drive the speakers 120 in a desired manner. In alternate embodiments, the DJ equipment control signals 285 may drive any number of output devices (e.g., a fog machine, lights, screens, etc.) in addition to or instead of the speakers 120. As described in conjunction with FIG. 1A, the control console 150 is operable in two different modes: a console-based control mode and a mobile control mode. The hybrid control console 150 includes, without limitation, the control source selector 160, a control switch 250, and the mobile control application 180.

The control source selector 160 enables the DJ to transition between the console-based control mode and the mobile control mode. More specifically, the control source selector 160 is a selection device that configures a control switch 250 to translate either console-based control signals or, alternatively, DJ-derived control signals 245 to the DJ equipment control signals 285. The control source selector 160 may be implemented in any technically feasible fashion, in any unit or as a stand-alone unit, and may direct the control switch 250 using any communication mechanism. Further, the console-based control signals 280 may be generated in any conventional manner, such as via a commercially available, conventional DJ console that is included in the hybrid control console 150.

The mobile control application 180 generates the DJ derived control signals 245 based on techniques described in conjunction with FIG. 1A. As shown, the mobile control application 180 includes, without limitation, a DJ viewpoint unit 220, a gesture interpretation unit 230, and a DJ equipment controller 240. In operation, the DJ viewpoint unit 220 receives viewpoint data 205 from the mobile device 130, and determines the position and viewing angle of a DJ that is wearing the mobile device 130. The gesture interpretation unit 230 receives movement data 205 from the cameras 132 that are configured to monitor the DJ, extracts gestures from the movement data 205, and then translate the gestures to desired control actions, such as muting speakers. The DJ equipment controller 240 determines the zones 122 that correspond to the position and viewing angle of the DJ and then relays the desired control actions to the speakers 120 included in these zones 122.

In alternate embodiments, the functionality implemented in the mobile control application 180 may be distributed across any number of applications. Further, the functionality may be implemented via any number and type of units that may or may not be included in the mobile control application 180. In some embodiments, the cameras 132 may include gesture detection software and, consequently, the gesture interpretation unit 230 and associated functionality may be omitted from the mobile control application 180.

In other embodiments, the DJ equipment controller 240 determines the zones 122 to actively control based on gestures in addition to or instead of the position and viewing angle of the DJ. For example, and without limitation, in one embodiment, the DJ equipment controller 240 may recognize a gesture that maps to "select all equipment" and, in response, ignore the position and viewing angle of the DJ and relay associated control actions to all of the speakers 120. In general, the DJ equipment controller 240 may implement any consistent heuristic to determine the zones 122 that the DJ controls via gestures.

In alternate embodiments, the hybrid control console 150 may also leverage the vision-based zone detection/control techniques disclosed herein while the hybrid control console 150 is operating in the console-based control mode. Notably, in such embodiments, the vision-based zone control and/or gesture recognition techniques may supplement the selection mechanisms that are embedded in the hybrid control console 150.

Selecting Zones

Figure 3:
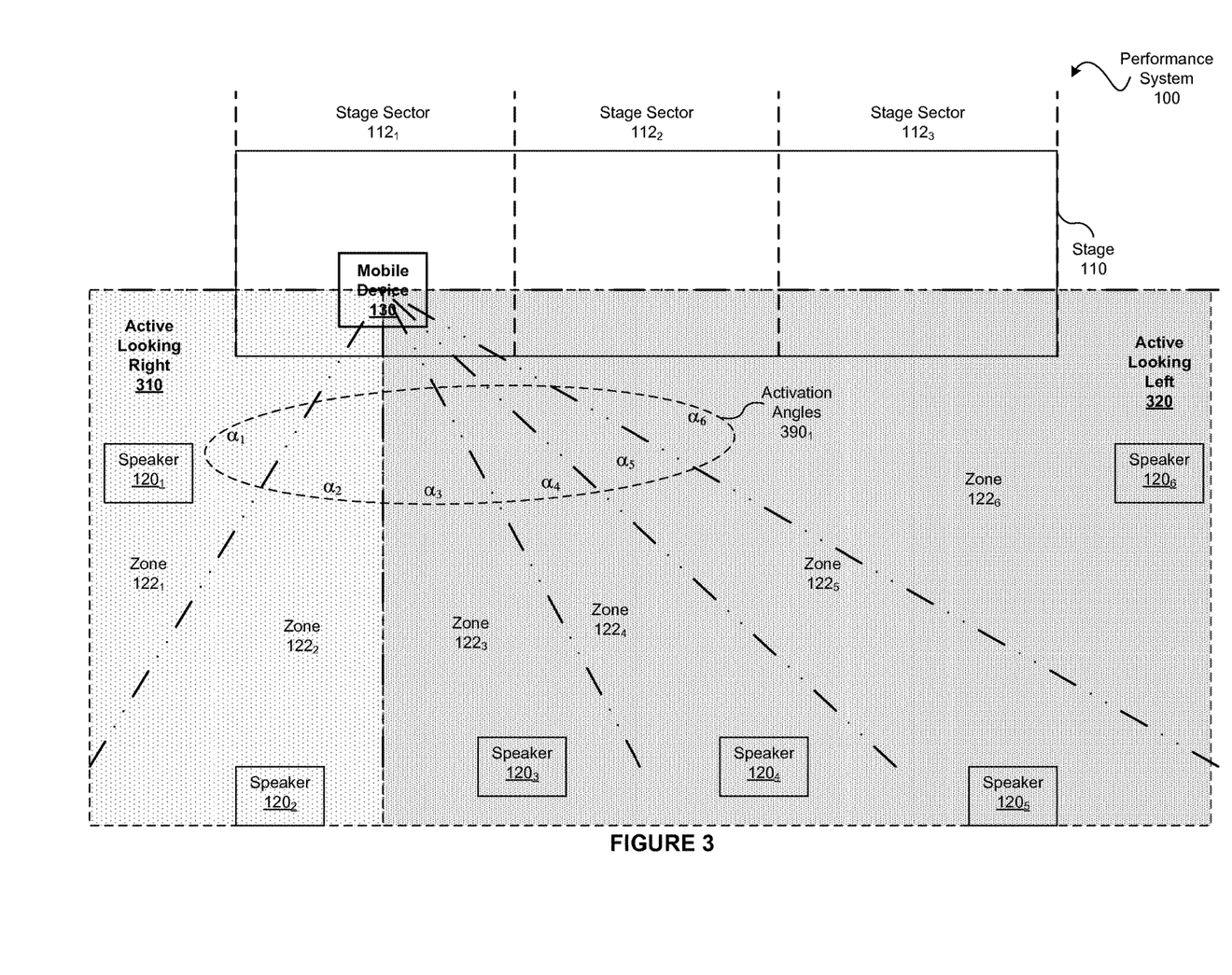
FIG. 3 is a conceptual illustration of zones selected by the DJ equipment controller of FIG. 2 when the DJ is positioned in the right-most stage sector, according to various embodiments.

FIG. 3 is a conceptual illustration of zones 122 selected by the DJ equipment 240 controller of FIG. 2 when the DJ is positioned in the right-most stage sector $112_1$, according to various embodiments. In FIG. 3, the mobile control application 180 has completed a setup phase during which the mobile control application 180 precomputed activation angles 390 that correspond to the DJ viewing angle at which each of the zones 122 is activated. As persons skilled in the art will recognize, such angles vary based on the position of the DJ. Accordingly, the mobile control application 180 is configured to generate a different set of activation angles 390 for each of the stage sectors 112.

In FIG. 3, the mobile device 130 and, consequently, the DJ, is located in the right-most (looking out at the audience) stage sector $112_1$. The precomputed activation angles $390_1$ that are associated with the stage sector $112_1$ are labelled as $\alpha_1$-$\alpha_6$. In operation, the DJ equipment controller 240 determines whether each of the zones 122 lies within an "active" field of view based on the DJ viewing angle and the activation angles $390_1$. The DJ equipment controller 240 may implement any technically feasible and consistent heuristic to determine the "active" field of view.

In the embodiment depicted in FIG. 3, the DJ equipment controller 240 is configured to select a set of zones 122 that lie to the left of the DJ, a set of zones 122 that lie to the right of the DJ, or all of the zones 122. In operation, the DJ equipment controller 240 determines whether the DJ is looking forward, left, or right based on the DJ viewing angle and a predetermined margin of error, such as approximately 10 degrees.

If the DJ equipment controller 240 determines that the DJ viewing angle is within the predetermined margin of the angle designating "forward," then the DJ equipment controller 240 selects all of the zones 122 and, consequently, all of the speakers 120.

If the DJ equipment controller 240 determines that the DJ viewing angle is within the predetermined margin of the angle designating "left," then the DJ equipment controller 240 selects the zones 122 that lie within ninety degrees of "left." More specifically, the DJ equipment controller 240 performs a comparison between each of the activation angles $390_1$ and the angle designating "left." An "active looking left" 320 rectangle that is shaded dark grey depicts the four zones 122 of the six zones 122 that the DJ equipment controller 240 selects based on these comparison operations.

If the DJ equipment controller 240 determines that the DJ viewing angle is within the predetermined margin of the angle designating "right," then the DJ equipment controller 240 selects the zones 122 that lie within ninety degrees of "right." More specifically, the DJ equipment controller 240 performs a comparison operation between each of the activation angles $390_1$ and the angle designating "right." An "active looking right" 310 rectangle that is shaded light grey depicts the two zones 122 of the six zones 122 that the DJ equipment controller 240 selects based on these comparison operations.

Advantageously, as illustrated by the different number of zones include in the active looking left 320 and the active looking right 310 regions, the selection heuristic illustrated in FIG. 3 enables the DJ to control variable numbers of zones 122 by strategically shifting position and viewing angle towards the speakers 120 of interest.

Figure 4:
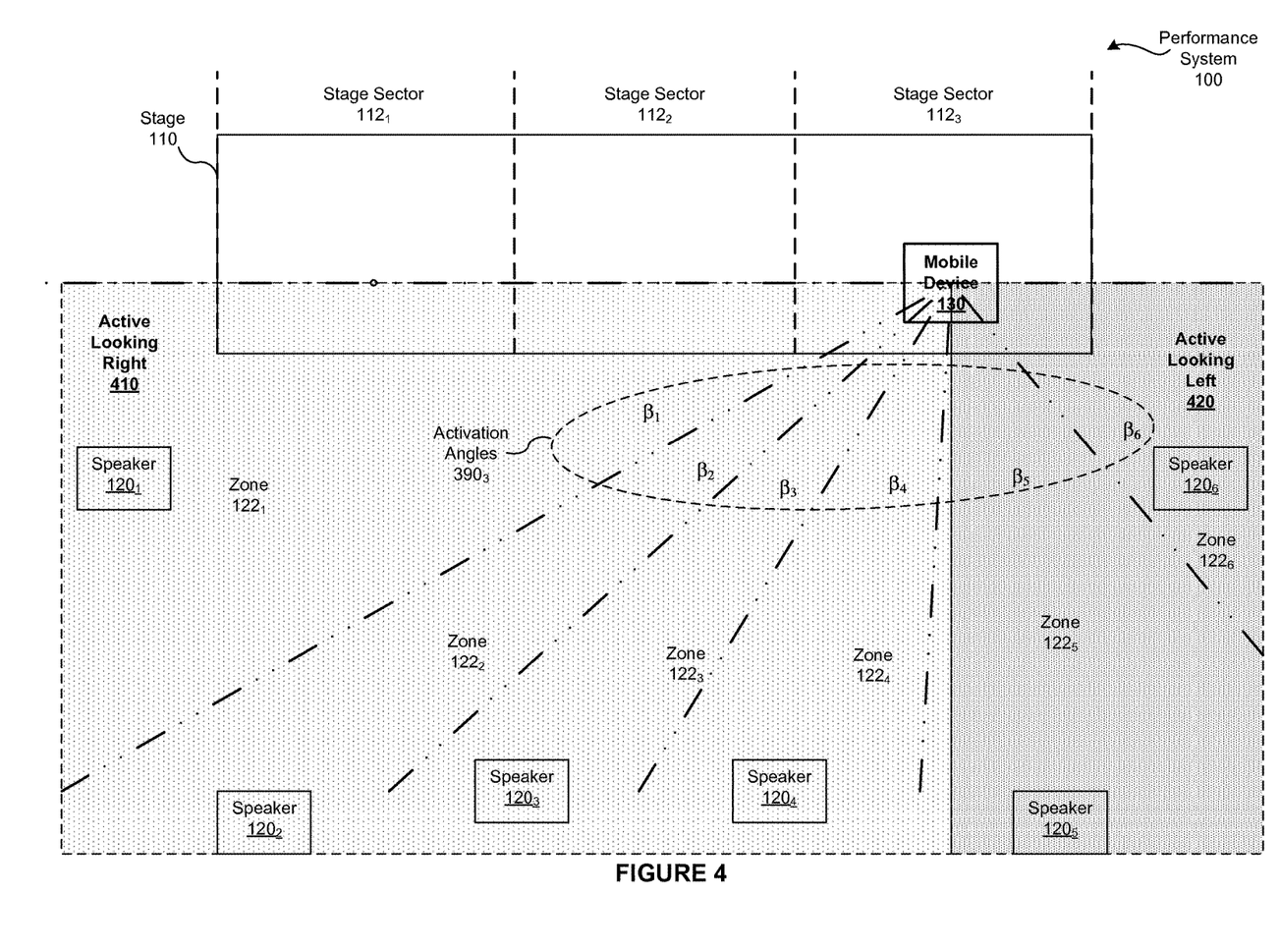
FIG. 4 is a conceptual illustration of zones selected by the DJ equipment controller of FIG. 2 when the DJ is positioned in the left-most stage sector, according to various embodiments.

FIG. 4 is a conceptual illustration of zones 122 selected by the DJ equipment 240 controller of FIG. 2 when the DJ is positioned in the left-most stage sector $112_3$, according to various embodiments. In FIG. 4, the DJ has moved from the position depicted in FIG. 3 (i.e., the right-most stage sector $112_1$) to the left-most stage sector $112_3$.

The precomputed activation angles $390_3$ that are associated with the stage sector $112_3$ are labelled as $\beta_1$-$\beta_6$. In operation, the DJ equipment controller 240 determines whether each of the zones 122 lies within an "active" field of view based on the DJ viewing angle and the activation angles $390_3$. In the embodiment depicted in FIG. 4, the DJ equipment controller 240 is configured to implement the forward/left/right section heuristic detailed in conjunction with FIG. 3.

If the DJ equipment controller 240 determines that the DJ viewing angle is within the predetermined margin of the angle designating "left," then the DJ equipment controller 240 selects the zones 122 that lie within ninety degrees of "left." More specifically, the DJ equipment controller 240 performs a comparison operation between each of the activation angles $390_3$ and the angle designating "left." An "active looking left" 420 rectangle that is shaded dark grey depicts the two zones 122 of the six zones 122 that the DJ equipment controller 240 selects based on these comparison operations.

If the DJ equipment controller 240 determines that the DJ viewing angle is within the predetermined margin of the angle designating "right," then the DJ equipment controller 240 selects the zones 122 that lie within ninety degrees of "right." More specifically, the DJ equipment controller 240 performs a comparison operation between each of the activation angles $390_3$ and the angle designating "right." An "active looking right" 410 rectangle that is shaded light grey depicts the four zones 122 of the six zones 122 that the DJ equipment controller 240 selects based on these comparison operations.

Notably, when the DJ is located in the left-most stage sector $112_3$ and looks to the left, the DJ equipment controller 240 selects two of the zones 122 for control purposes. By contrast, as illustrated in FIG. 3, when the DJ is located in the right-most stage sector $112_1$ and looks to the left, the DJ equipment controller 240 selects four of the zones 122 for control purposes. Advantageously, the selection heuristic implemented in this embodiment realistically reflects the field of view of the DJ.

Integrating Mobile and Console-Based Inputs

Figure 5:
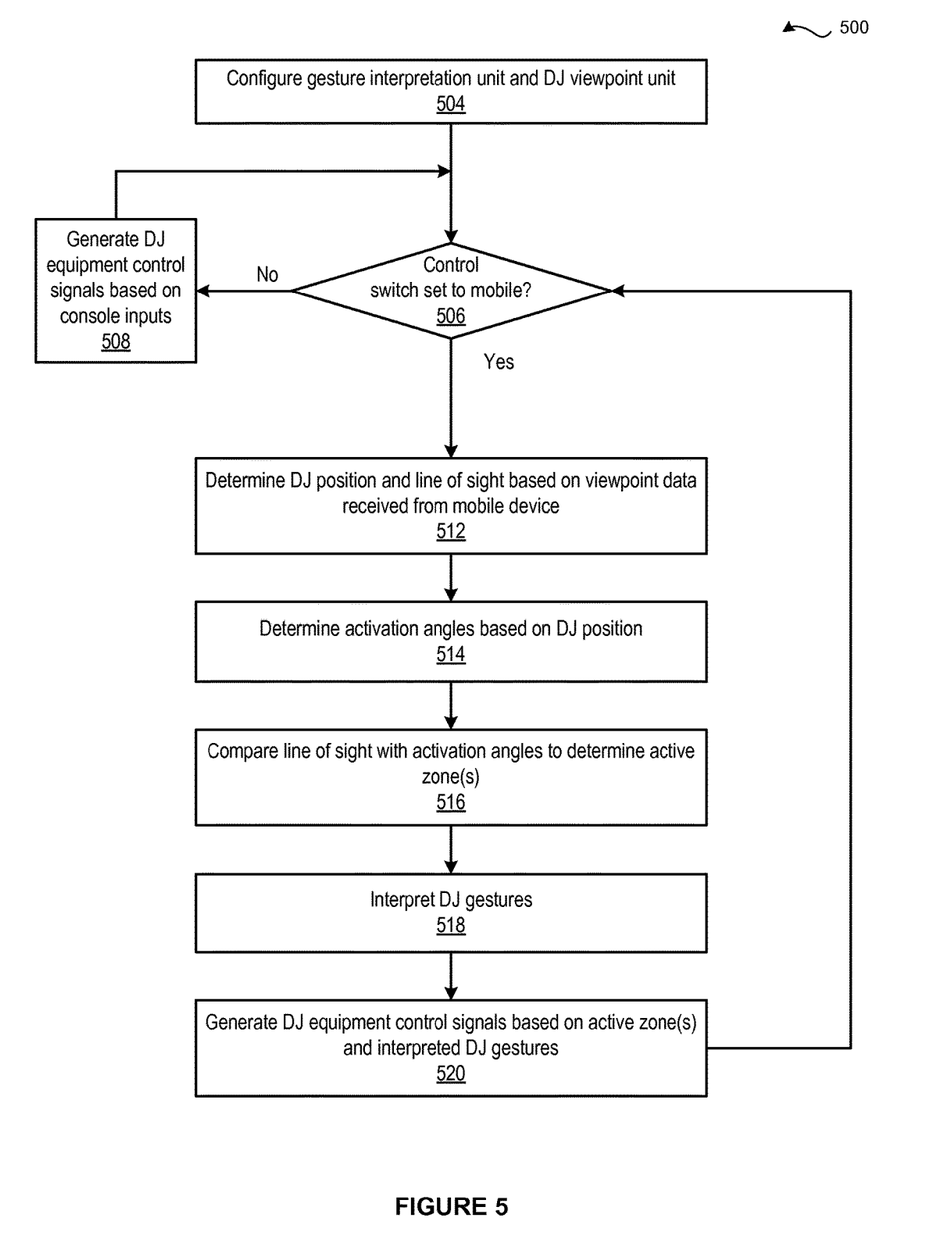
FIG. 5 is a flow diagram of method steps for integrating mobile and console-based inputs to control disc jockey equipment, according to various embodiments.

FIG. 5 is a flow diagram of method steps for integrating mobile and console-based inputs to control disc jockey equipment, according to various embodiments. Although the method steps are described in conjunction with the systems of FIGS. 1-4, persons skilled in the art will understand that any system configured to implement the method steps, in any order, falls within the scope of the present invention.

As shown, a method 500 begins at step 504, where the mobile control application 180 configures the DJ viewpoint unit 220 and the gesture interpretation unit 230. More specifically, the mobile control application 180 configures the DJ viewpoint unit 220 to recognize specific patterns of the sensors 320 from various positions and angles on the stage 110 using any pattern recognition technique as known in the art. Further, the mobile control application 180 "trains" the gesture interpretation unit 230 to recognize and map gestures to actions that control the speakers 120.

At step 506, the hybrid control console 150 determines whether the control source selector 160 specifies the mobile control mode. If, at step 506, the hybrid control console 150 determines that the control source selector 160 does not specify the mobile control mode, then the method 500 proceeds to step 508. At step 508, the hybrid control console 150 generates the DJ equipment control signals 285 based on the console-based control signals 280 in a conventional manner and the method 508 returns to step 506. The hybrid control console 150 continues to cycle through steps 506 and 508, performing conventional console-based control operations, until the hybrid control console 150 detects that the control source selector 160 specifies the mobile control mode.

If, at step 506, the hybrid control console 150 determines that the control source selector 160 specifies the mobile control mode, then the method 500 proceeds directly to step 512. At step 512, the DJ viewpoint unit 220 determines the location and the line of sight of the DJ based on the viewpoint data 205 transmitted from the mobile device 130 worn by the DJ. More specifically, the DJ viewpoint unit 220 determines the location and the line of sight based on comparing the viewpoint data 205 to the specific patterns programmed in step 504. In alternate embodiments, the DJ viewpoint unit 220 may determine the location and/or the line of sight based on any data that reflects the vantage point and/or perspective of the DJ.

At step 514, the DJ equipment controller 240 analyzes the location of the DJ to determine the activation angles 390 corresponding to the DJ viewing angle that activates each of the zones 122. The DJ equipment controller 240 may determine the activation angles 390 in any technically feasible fashion that is consistent with the implemented zone-selection heuristic. In alternate embodiments, the DJ equipment controller 240 precomputes multiple sets of the activation angles 390 and selects the appropriate set based on the location of the DJ. At step 516, the DJ equipment controller evaluates the DJ viewing angle in conjunction with the activation angles 390 to determine which of the zones 122 is "active." In general, the active zones 122 lie within the field of view of the DJ.

At step 518, the gesture interpretation unit 230 receives movement data 205 from the cameras 132 that are configured to monitor the DJ, extracts gestures from the movement data 205, and then interprets the gestures. In this fashion, the gesture interpretation unit 230 maps the motions of the DJ to desired control actions, such as muting speakers 120.

At step 520, the DJ equipment controller 240 generates the DJ derived control signals 245 that configure the speakers 120 included in the active zones 122 to implement the actions indicated by the gestures. As part of step 520, the control switch 250 routes the DJ-derived control signals 245 (now the DJ equipment control signals 285) to the impacted speakers 220, overriding and/or supplementing console based control signals 280. The method 500 then returns to step 506. The hybrid control console 150 continues to cycle through steps 506 and 520, operating in either the mobile control mode or the console-based control mode based on the setting of the control source selector 160.

In sum, the disclosed techniques enable DJs to efficiently control DJ equipment while moving freely within an performance system. In operation, a hybrid control console enables the DJ to transition between a console-based input mode and a mobile input mode. In the console-based mode, the hybrid control console generates and transmits control signals to DJ equipment, such as speakers, based on the settings/states of conventional console-based selection devices (e.g., switches, knobs, graphical user interfaces, etc.) In the mobile mode, the hybrid control console generates and transmits control signals to DJ equipment based on signals generated by a mobile control application that includes a DJ viewpoint unit, a gesture interpretation unit, and a DJ equipment controller.

Upon transitioning to the mobile mode, the DJ viewpoint unit processes input from a camera-equipped mobile device worn by the DJ and compares the input images to images of markers deployed throughout the performance system. Based on the pattern of the markers, the DJ viewpoint unit establishes both the location and the viewing angle of the DJ. The gesture interpretation unit application analyzes video feeds from one or more stage-based cameras that track the motions of the DJ to identify sequences of motions (e.g., predetermined gesture patterns) performed by the DJ. The gesture interpretation unit then maps the observed gestures to one or more control settings, such as volume, tempo, etc. Subsequently, the DJ equipment controller generates control signals that drive the DJ equipment within a field of view of the DJ based on the settings selected by the gestures of the DJ.

Advantageously, the disclosed techniques enable the DJ to move unencumbered through the performance system while maintaining control of the DJ equipment. Notably, because the DJ is able to dynamically manipulate the DJ equipment while interacting with and observing the audience, the DJ may tune the performance to optimize the listening experience for the audience in a more informed fashion. By contrast, conventional control systems that enable input via only the hybrid control console compromise the connection between the DJ and the audience and/or reduce the ability of the DJ to control the DJ equipment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of audiovisual equipment and sensors, persons skilled in the art will appreciate that the systems and techniques described herein are applicable to other types of performance output devices (e.g., lasers, fog machines, etc.) and sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling output devices, the method comprising:
    identifying one or more visual sensors included in first visual data received from a mobile device of a user, wherein the one or more visual sensors are separate from the user of the mobile device and are positioned at a distance from the user of the mobile device;
    determining an activation angle range based on the one or more visual sensors included in the first visual data;
    determining that the activation angle range intersects a first zone that is included in a plurality of zones defined within an environment and includes a first output device, wherein each zone included in the plurality of zones is defined by at least one different visual sensor deployed within the environment and includes a different output device;
    analyzing second visual data to determine a gesture associated with the mobile device; and
    in response to the gesture, transmitting a first control signal to the first output device.

2. The method of claim 1, further comprising:
    determining that a control switch has changed from a first state that corresponds to the mobile device to a second state that corresponds to a control console;
    selecting a second output device based on first input received from the control console; and
    generating and transmitting a second control signal to the second output device based on second input received from the control console.

3. The method of claim 1, wherein the first control signal controls at least one of an audio parameter, a visual parameter, and a special effect.

4. The method of claim 1, wherein the activation angle range is determined based on the location of the mobile device and an angle of interest between the mobile device and the one or more visual sensors.

5. The method of claim 4, wherein the mobile device is associated with a plurality of output devices, and the angle of interest corresponds to a forward-facing field of view, and further comprising selecting all of the output devices included in the plurality of output devices.

6. The method of claim 5, further comprising determining that the angle of interest and a forward-facing angle are within a predetermined margin of error.

7. The method of claim 1, wherein identifying the one or more visual sensors comprises recognizing an infrared-based pattern of the one or more visual sensors.

8. The method of claim 1, wherein identifying the one or more visual sensors comprises recognizing, via a pattern recognition technique, a predetermined pattern that corresponds to the one or more visual sensors.

9. The method of claim 1, wherein identifying the one or more visual sensors comprises recognizing text that corresponds to the one or more visual sensors.

10. A computer-implemented method for controlling output devices, the method comprising:
  determining an angle of interest based on first visual data received from a mobile device;
  selecting a first output device based on a location of the mobile device and the angle of interest, comprising:
    partitioning a stage into a plurality of stage sectors, wherein each stage sector is associated with a range of locations;
    for each stage sector included in the plurality of stage sectors, calculating a set of activation angles, wherein each activation angle corresponds to a different viewing zone;
    selecting a first stage sector included in the plurality of stage sectors based on the location of the mobile device; and
    determining that the first output device is within a first viewing zone based on the activation angles associated with the first stage sector and the angle of interest;
  analyzing second visual data to determine a gesture associated with the mobile device; and
  in response to the gesture, transmitting a first control signal to the first output device.

11. The method of claim 10, wherein determining that the first output device is within the first viewing zone comprises determining that the angle of interest does not exceed a first activation angle that corresponds to a first viewing zone but exceeds a second activation angle that corresponds to a second viewing zone that is adjacent to the first viewing zone.

12. A non-transitory, computer-readable storage medium including instructions that, when executed by a processor, cause the processor to control output devices, by performing the steps of:
  identifying one or more visual sensors included in first visual data received from a mobile device of a user, wherein the one or more visual sensors are separate from the user of the mobile device and are positioned at a distance from the user of the mobile device;
  determining an activation angle range based on the one or more visual sensors included in the first visual data;
  determining that the activation angle range intersects a first zone that is included in a plurality of zones defined within an environment and includes a first output device, wherein each zone included in the plurality of zones is defined by at least one different visual sensor deployed within the environment and includes a different output device;
  analyzing second visual data to determine a gesture associated with the mobile device; and
  in response to the gesture, transmitting a first control signal to the first output device.

13. The non-transitory computer-readable storage medium of claim 12, further comprising:
  determining that a control switch has changed from a first state that corresponds to the mobile device to a second state that corresponds to a control console;
  selecting a second output device based on first input received from the control console; and
  generating and transmitting a second control signal to the second output device based on second input received from the control console.

14. The non-transitory computer-readable storage medium of claim 13, wherein the first output device is an audio device and the second output device is a lighting device.

15. The non-transitory computer-readable storage medium of claim 12, further comprising:
  partitioning a stage into a plurality of stage sectors, wherein each stage sector is associated with a range of locations;
  selecting a first stage sector included in the plurality of stage sectors based on the location of the mobile device; and
  determining that the first output device is within the first zone based on the location of the first stage sector and the angle of interest.

16. The non-transitory computer-readable storage medium of claim 12, wherein the first control signal modifies at least one of volume and tempo of an audio track.

17. The non-transitory computer-readable storage medium of claim 12, wherein the activation angle range is determined based on the location of the mobile device and an angle of interest between the mobile device and the one or more visual sensors.

18. The non-transitory computer-readable storage medium of claim 12, wherein the first output device is positioned to the left of the location of the mobile device, and selecting the first output device comprises determining an angle of interest that corresponds to a left-facing field of view of the mobile device, and, in response, selecting a plurality of output devices that are positioned to the left of the location of the mobile device.

19. The non-transitory computer-readable storage medium of claim 18, wherein determining the angle of interest comprises:
  calculating a difference between the angle of interest and a reference angle associated with the left-facing field of view; and
  determining that the difference is less than a predetermined margin of error.

20. The non-transitory computer-readable storage medium of claim 12, further comprising:
  partitioning a stage into a plurality of stage sectors, wherein each stage sector is associated with a range of locations;
  for each stage sector included in the plurality of stage sectors, calculating a set of activation angles, wherein each activation angle corresponds to a different viewing zone;
  selecting a first stage sector included in the plurality of stage sectors based on the location of the mobile device; and determining that the first output device is within the first zone based on the activation angles associated with the first stage sector.

21. A system for controlling output devices, comprising:

a mobile device of a user configured to acquire first visual data; and a processor coupled to the mobile device and configured to:

identify one or more visual sensors included in the first visual data, wherein the one or more visual sensors are separate from the user of the mobile device and are positioned at a distance from the user of the mobile device;

determine an activation angle range based on the one or more visual sensors included in the first visual data;

determine that the activation angle range intersects a first zone that is included in a plurality of zones defined within an environment and includes a first output device, wherein each zone included in the plurality of zones is defined by at least one different visual sensor deployed within the environment and includes a different output device;

analyze second visual data to determine a gesture associated with the mobile device; and in response to the gesture, transmit a first control signal to the first output device.

22. The system of claim 21, wherein the processor is further configured to:

identify a second visual sensor included in the first visual data; and select a second output device included in the plurality of output devices based on identifying the second visual sensor, wherein the second visual sensor is associated with a second zone in which the second output device is located, and the second zone is included in the plurality of zones.

* * * * *